US011884060B2

(12) United States Patent
Tanizaki

(10) Patent No.: US 11,884,060 B2
(45) Date of Patent: Jan. 30, 2024

(54) PRINT DEVICE

(71) Applicant: BROTHER KOGYO KABUSHIKI KAISHA, Nagoya (JP)

(72) Inventor: Masashi Tanizaki, Kuwana (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 63 days.

(21) Appl. No.: 17/825,611

(22) Filed: May 26, 2022

(65) Prior Publication Data

US 2022/0379631 A1 Dec. 1, 2022

(30) Foreign Application Priority Data

May 31, 2021 (JP) ................................ 2021-090812

(51) Int. Cl.

| | |
|---|---|
| ***B41J 11/00*** | (2006.01) |
| ***B41J 29/02*** | (2006.01) |
| ***B41J 15/04*** | (2006.01) |
| ***B41J 2/32*** | (2006.01) |
| ***B41J 29/12*** | (2006.01) |
| *B41J 29/18* | (2006.01) |

(52) U.S. Cl.

CPC ............ *B41J 11/0095* (2013.01); *B41J 2/32* (2013.01); *B41J 15/042* (2013.01); *B41J 15/046* (2013.01); *B41J 29/02* (2013.01); *B41J 29/12* (2013.01); *B41J 29/18* (2013.01)

(58) Field of Classification Search

CPC ........ B41J 11/0095; B41J 2/32; B41J 15/042; B41J 15/046; B41J 29/02; B41J 29/12; B41J 29/18

See application file for complete search history.

(56) References Cited

U.S. PATENT DOCUMENTS

| | | | | |
|---|---|---|---|---|
| 5,551,337 A * | 9/1996 | Miki | ........................ | B41C 1/144 101/DIG. 46 |
| 9,233,567 B2 * | 1/2016 | Yada | ........................ | B41J 29/023 |
| 2005/0214054 A1 * | 9/2005 | Hoshino | ............. | B65C 11/0289 400/613 |

FOREIGN PATENT DOCUMENTS

| | | |
|---|---|---|
| JP | 2005-289572 A | 10/2005 |

* cited by examiner

*Primary Examiner* — Henok D Legesse

(74) *Attorney, Agent, or Firm* — KENEALY VAIDYA LLP

(57) ABSTRACT

A print device includes a head, a medium holding portion, an opening/closing cover, a feed path, a sensor, a window portion, and a blocking wall. The medium holding portion holds the medium and open to allow the medium to be taken out and put in. The opening/closing cover opens and closes an opening in the medium holding portion. The feed path extends from the medium holding portion toward the head and feeding the medium. The sensor is provided in the feed path. The window portion is provided in a position corresponding to between the sensor and the head, in a wall portion of the case, and allows the inside of the case to be seen from outside. The blocking wall is provided between the sensor and the window portion, and blocks a light coming in through the window portion toward the sensor.

6 Claims, 6 Drawing Sheets

PRINT DEVICE

CROSS-REFERENCE TO RELATED APPLICATION

This application claims priority to Japanese Patent Application No. 2021-090812, filed on May 31, 2021, the content of which is hereby incorporated by reference.

BACKGROUND

The present disclosure relates to a print device.

A print device in which a thermal head moves in response to a lever being rotatably operated is known. A user rotates the lever upward to separate the thermal head from a platen roller. The user inserts a tip end of a medium from an insertion opening in a case, and positions and sets the medium on the thermal head. After the setting of the medium is complete, the user rotates the lever downward to move the thermal head toward the platen roller side. The medium is pressed against the platen roller by the thermal head, and consequently placed in a state where printing is possible. A feed path for the medium is provided inside the case. The feed path extends from the insertion opening toward the thermal head. An optical sensor is provided midway along the feed path. A mark for detecting the position of the medium is printed on the medium. The print device detects the feed amount of the medium by shining light from the optical sensor onto the mark.

SUMMARY

If the distance between an insertion opening and a thermal head is far, the position of a tip end of a medium is difficult to ascertain when a user has inserted the tip end of the medium, thus making the medium difficult to set.

The object of the present disclosure is to provide a print device in which the position of a tip end of a medium can be checked from outside a case, and which is able to suppress the effect of outside light on a sensor.

Various embodiments herein provide a print device includes a head, a medium holding portion, an opening/closing cover, a feed path, a sensor, a window portion, and a blocking wall. The head is provided in a case. The head performs printing on a medium. The medium holding portion is provided in the case. The medium holding portion holds the medium and open to allow the medium to be taken out and put in. The opening/closing cover opens and closes an opening in the medium holding portion. The feed path is provided in the case. The feed path extends from the medium holding portion toward the head and feeding the medium. The sensor is provided in the feed path. The sensor detects the medium. The window portion is provided in a position corresponding to between the sensor and the head, in a wall portion of the case. The window portion allows a inside of the case to be seen from outside. The blocking wall is provided between the sensor and the window portion. The blocking wall blocks a light coming in through the window portion toward the sensor.

BRIEF DESCRIPTION OF THE DRAWINGS

Embodiments of the disclosure will be described below in detail with reference to the accompanying drawings in which.

DETAILED DESCRIPTION

Figure 1:
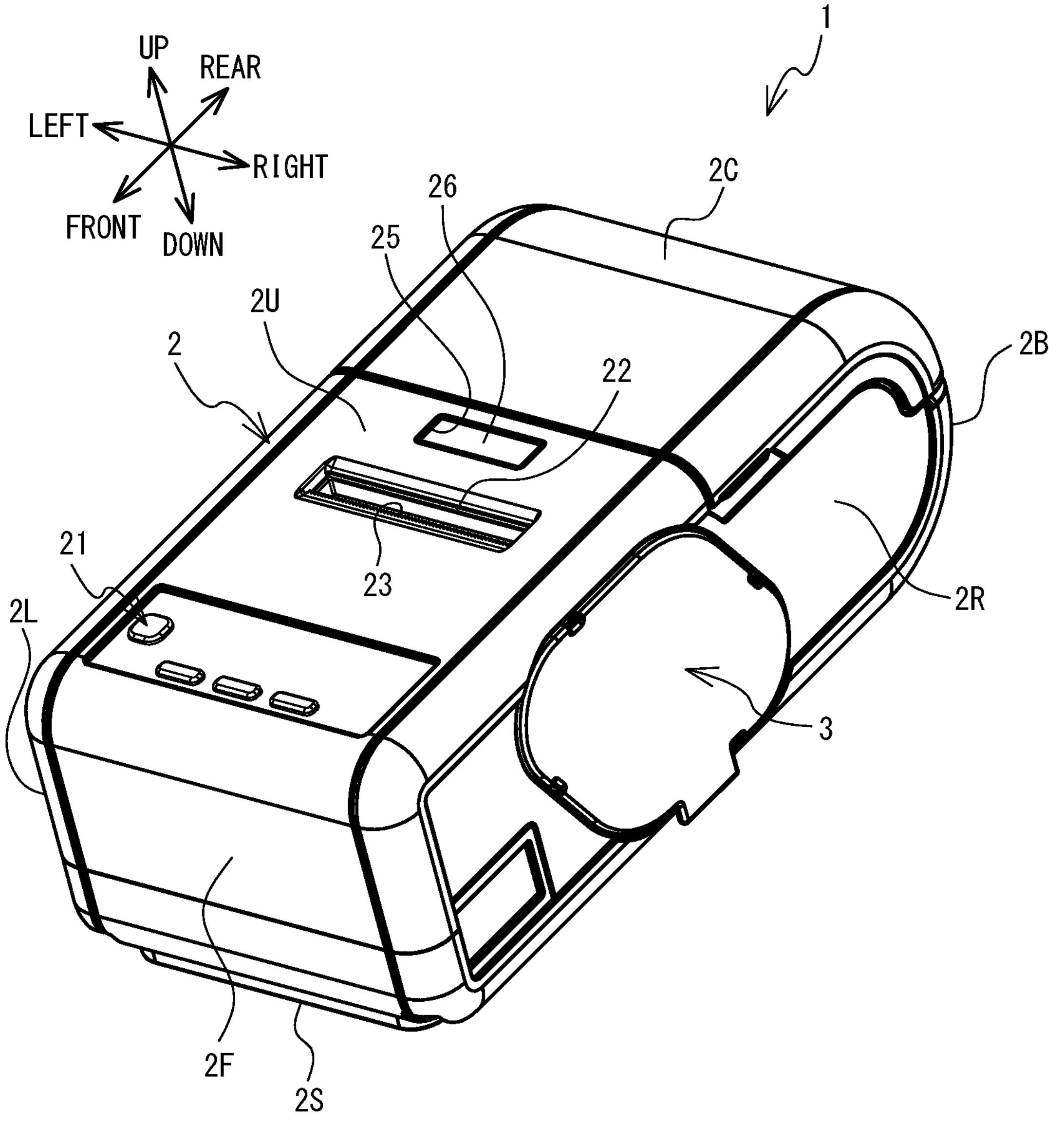
FIG. 1 is a perspective view of a print device.

An embodiment of the present disclosure will now be described. The accompanying drawings are to be used to illustrate the technical characteristics that may be employed by the present disclosure, and are merely illustrative examples that are in no way intended to limit the configuration and the like of the described device. The description below uses the terms “left” and “right”, “front” and “rear”, and “up” and “down” shown in the drawings. The up-down direction matches the vertical direction when a print device 1 is placed on a stand (not shown in the drawings).

Figure 2:
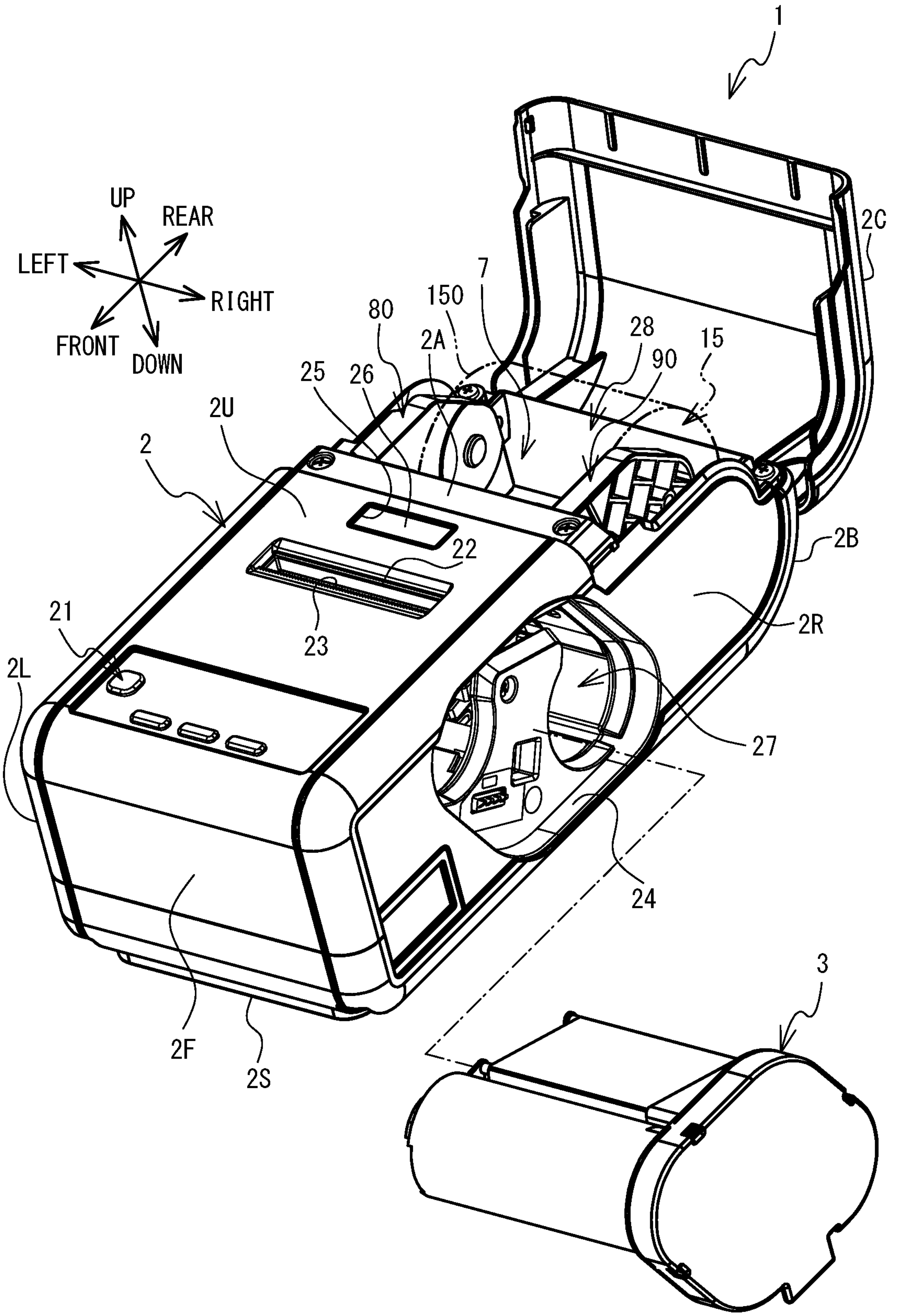
FIG. 2 is a perspective view of the print device in a state with an opening/closing cover open and a ribbon cartridge removed.

The structure of the print device 1 will be described with reference to FIG. 1 to FIG. 4. The print device 1 is a thermal-transfer print device. As shown in FIG. 1 and FIG. 2, the print device 1 is provided with a case 2. The case 2 houses therein a platen roller 4 (refer to FIG. 3), a print unit 5 (refer to FIG. 3), a pressure member 6 (refer to FIG. 3), a guide unit 7 (refer to FIG. 2 and FIG. 3), a control portion (not shown in the drawings), and a drive portion (not shown in the drawings), and the like. The control portion controls the operation of the print device 1. The drive portion is provided with a motor (not shown in the drawings), and feeds a print medium 150 and an ink ribbon 130. The platen roller 4, the print unit 5, and the pressure member 6 will be described in detail later.

The case 2 has an upper wall 2U, a lower wall 2S, a left wall 2L, a right wall 2R, a front wall 2F, a rear wall 2B, and an opening/closing cover 2C. Switches 21 are provided on the front side of the upper surface of the upper wall 2U. An ejection portion 22 is provided to the rear of the switches 21. The ejection portion 22 is a through-hole that passes through the upper wall 2U in the up-down direction. The ejection portion 22 has a substantially rectangular shape that is long in the left-right direction when viewed from above. The print medium 150 (refer to FIG. 3) that has been printed in the case 2 is ejected out of the case 2 from the ejection portion 22. A cutting portion 23 is provided on a front end portion of the ejection portion 22. The cutting portion 23 has a cutting blade, and is able to cut the print medium 150 ejected from the ejection portion 22.

On the upper surface of the upper wall 2U, an opening 25 is provided to the rear of the ejection portion 22. The opening 25 has a substantially rectangular shape that is long in the left-right direction when viewed from above, and is a through-hole that passes through the upper wall 2U in the up-down direction. The length of the opening 25 in the left-right direction is shorter than the length of the ejection portion 22 in the left-right direction. A window portion 26 is embedded inside the opening 25. The window portion 26 is transparent resin, but need only be transparent material. A user can see into the case 2 through the window portion 26. An eave portion 2A is provided on a rear end portion of the upper wall 2U. The eave portion 2A has a substantially rectangular shape that is long in the left-right direction when viewed from above, and is provided lower, by the amount of the thickness of the opening/closing cover 2C, than the upper surface of the upper wall 2U.

Figure 3:
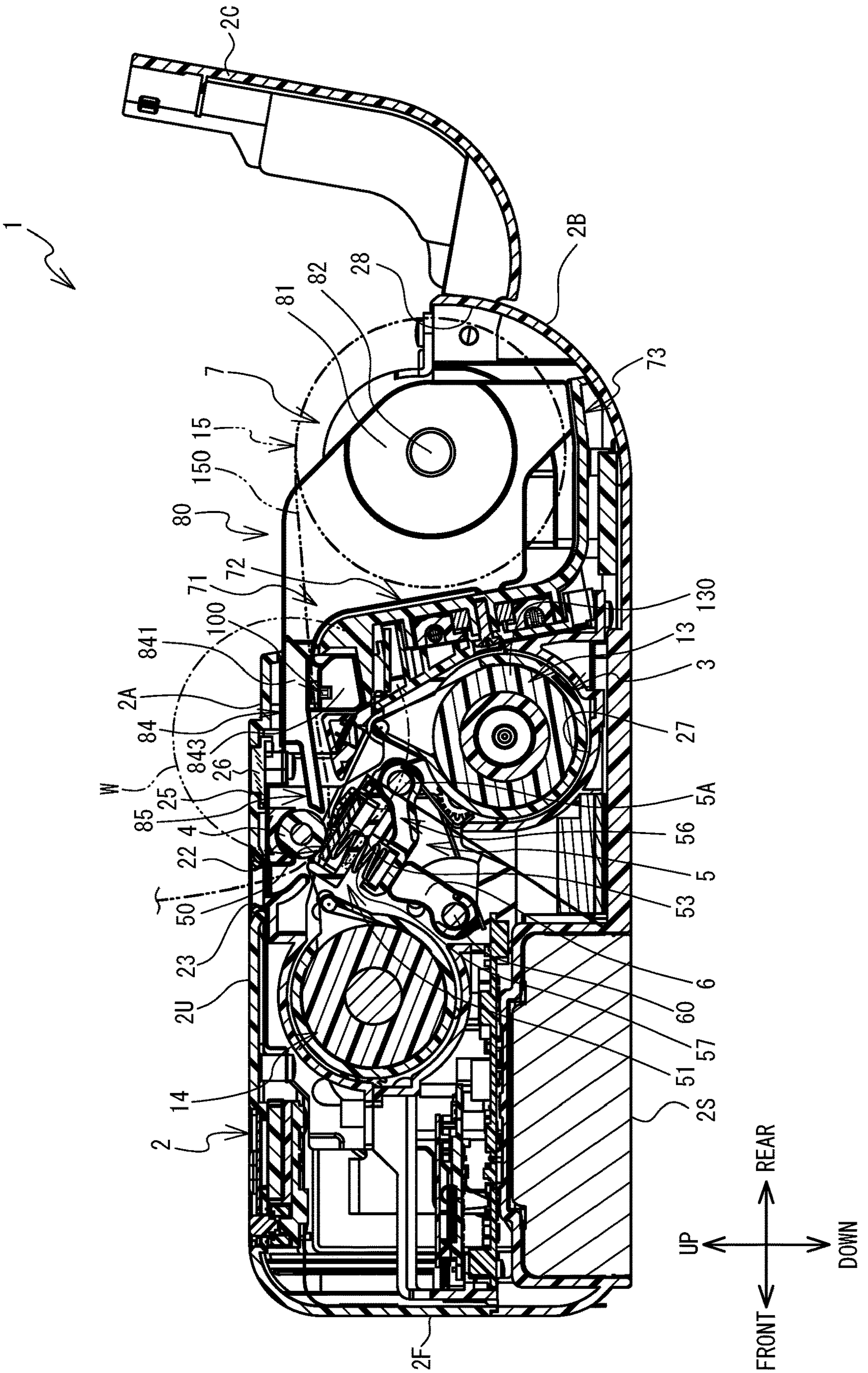
FIG. 3 is a cross-sectional view of the print device.

As shown in FIG. 2, an opening 24 is provided on the right surface of the right wall 2R. The opening 24 is communicated with a ribbon installation portion 27 provided inside the case 2. A ribbon cartridge 3 is removably installed from the right in the ribbon installation portion 27 (refer to FIG. 1). As shown in FIG. 3, the ribbon cartridge 3 houses a ribbon roll 13 and a winding roll 14. The ribbon roll 13 winds the ink ribbon 130 on a cylindrical tube and supports the ink ribbon 130 in a roll shape. The winding roll 14 winds up the ink ribbon 130 that has been used. The ink ribbon 130 that has been reeled out from the ribbon roll 13 is fed forward inside the case 2. The ink ribbon 130 is heated by a print head 50, described later, in the feeding process. The heated ink ribbon 130 is wound on the winding roll 14.

As shown in FIG. 2, a medium holding portion 28 is provided in a rear portion of the case 2. The medium holding portion 28 is open upward. The medium holding portion 28 holds a medium roll 15. The medium roll 15 winds the print medium 150 on a cylindrical tube and supports the print medium 150 in a roll shape. The guide unit 7 is disposed on the medium holding portion 28. The guide unit 7 supports the medium roll 15, and restricts the position of the center portion in the left-right direction of the medium roll 15 with respect to a feed path 16. Note that the specific structure of the guide unit 7 will be described later.

The opening/closing cover 2C is rotatably supported by an upper end portion of the rear wall 2B. The opening/closing cover 2C opens and closes the medium holding portion 28. The user replaces the medium roll 15 when the medium holding portion 28 is open. When the medium holding portion 28 is closed, the front end portion of the opening/closing cover 2C is disposed on the upper surface of the eave portion 2A provided on the rear end portion of the upper wall 2U. Thus, the upper surface of the opening/closing cover 2C becomes flush with the upper surface of the upper wall 2U.

As shown in FIG. 3, the print medium 150 is reeled out from the medium roll 15 supported on the guide unit 7, and fed along the feed path 16 (refer to FIG. 4) inside the case 2. The feed path 16 extends forward inside the case 2 from the medium holding portion 28, and passes below the platen roller 4 to the ejection portion 22. The print medium 150 runs parallel above the ink ribbon 130 reeled out from the ribbon roll 13 of the ribbon cartridge 3, upstream of the platen roller 4 in the feed path 16. At portions (hereinafter, referred to as "parallel running portions") of the print medium 150 and the ink ribbon 130 that run parallel to each other, the ink ribbon 130 is heated by the print head 50, described later, and the ink of the ink ribbon 130 is transferred to the print medium 150. The print medium 150 to which the ink has been transferred is then ejected out of the case 2 through the ejection portion 22.

Figure 4:
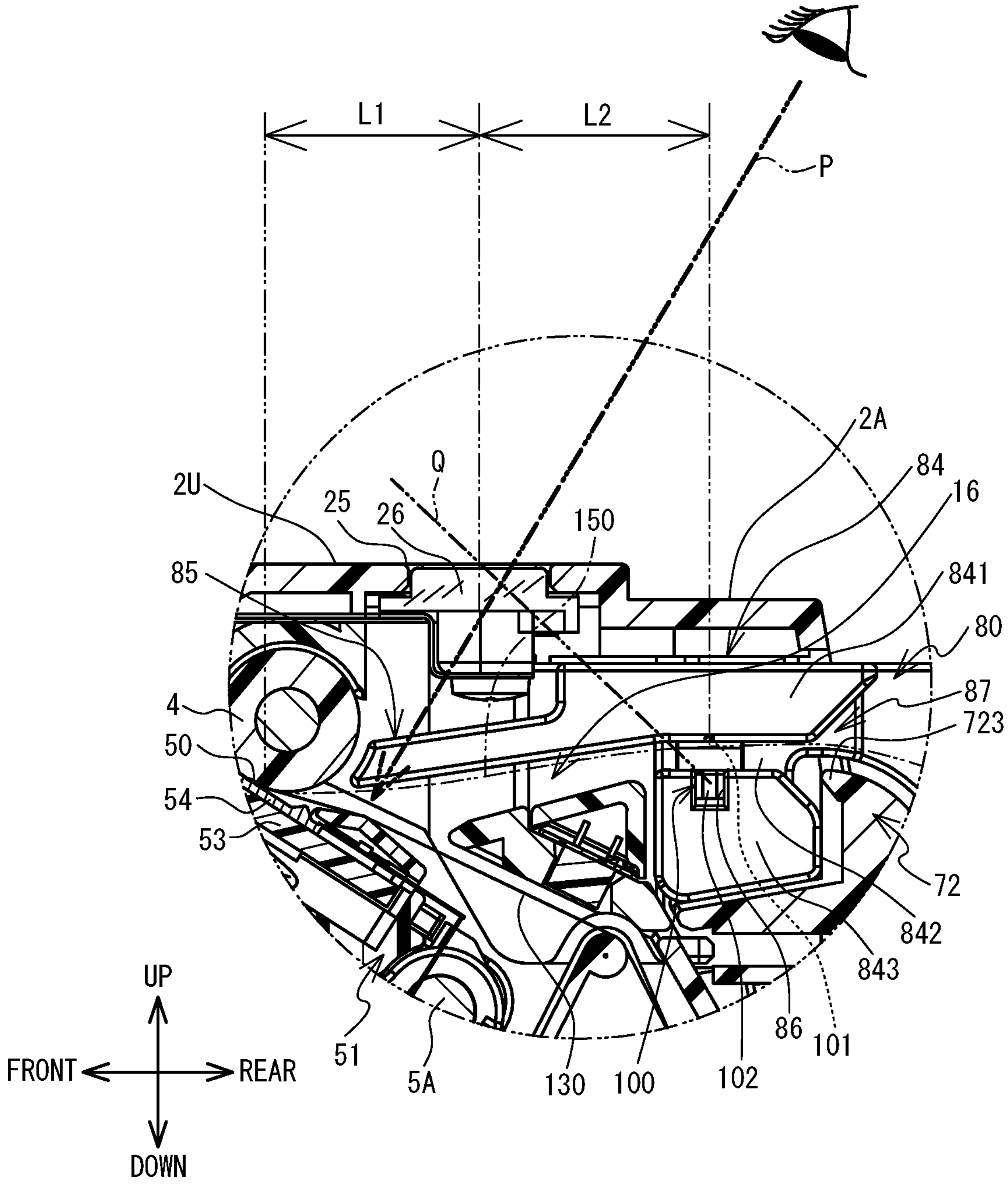
FIG. 4 is a partial enlarged view of the inside of region W shown in FIG. 3.

As shown in FIG. 3 and FIG. 4, the parallel running portions of the print medium 150 and the ink ribbon 130 are sandwiched between the platen roller 4 and the print head 50. The platen roller 4 has a circular cylindrical shape that extends in the left-right direction, and is disposed above the parallel running portion of the print medium 150. The platen roller 4 is rotatably supported inside the case 2, and is rotatably driven by the drive portion.

The print unit 5 is disposed below the parallel running portion of the ink ribbon 130. The print unit 5 is provided with the print head 50, a support portion 51, a base 53, a substrate 54, a movement portion 56, and a spring 57. As shown in FIG. 3, the support portion 51 has a plate shape, and is disposed slanting downward toward the rear from the front below the platen roller 4. A through-hole (not shown in the drawings) extending in the left-right direction is provided in a rear end portion of the support portion 51. A rotation shaft 5A is inserted through the through-hole. The rotation shaft 5A extends in the left-right direction and is fixed inside the case 2. The support portion 51 is supported so as to be able to rotate around the rotation shaft 5A. The rotation shaft 5A is disposed diagonally downward and to the rear of the platen roller 4.

FIG. 3 shows a state in which the support portion 51 has been rotated to the maximum in the clockwise direction around the rotation shaft 5A, when viewed from the right. The support portion 51 comes close to the platen roller 4 from below. The position of the support portion 51 disposed in the rotated position shown in FIG. 3 will be referred to as the "close position". When the support portion 51 is rotated in the counterclockwise direction around the rotation shaft 5A, when viewed from the right, from the close position, the support portion 51 moves downward away from the platen roller 4. The position of the support portion 51 that has moved away from the platen roller 4 will be referred to as a "separated position". The support portion 51 can pivot between the close position and the separated position around rotation shaft 5A.

The base 53 is fixed to the upper surface of the support portion 51. The base 53 is a heat sink. The substrate 54 is fixed to the upper surface of the base 53. The base 53 releases heat generated in the substrate 54. The print head 50 is provided on the upper surface of the substrate 54. The print head 50 is a line thermal head formed by a plurality of heating elements, and extends in the left-right direction. The print head 50 faces the platen roller 4 from below. The movement portion 56 is formed in a substantially V-shape when viewed from the right, with the substantially center portion in the front-rear direction bending downward. The rear end portion of the movement portion 56 is supported so as to be able to rotate around the rotation shaft 5A, and the front end portion of the movement portion 56 is disposed below the support portion 51. The spring 57 is disposed between the support portion 51 and the front end portion of the movement portion 56. The spring 57 is a compression coil spring. The spring 57 constantly urges the support portion 51 and the front end portion of the movement portion 56 in directions in which they separate from each other.

The pressure member 6 is formed in a rod shape, with one end portion thereof in the length direction being supported so as to be able to rotate around a rotation shaft 60. The rotation shaft 60 extends in the left-right direction and is fixed inside the case 2. The rotation shaft 60 is positioned below the rotation shaft 5A and diagonally in front of and below the platen roller 4. The other end portion of the pressure member 6 on the opposite side from the one end portion is able to contact the front end portion of the movement portion 56 from below. The pressure member 6 is connected to a lever (not shown in the drawings) provided on the outside of the case 2. The pressure member 6 rotates around the rotation shaft 60 in response to the user operating the lever (hereinafter, referred to as a "lever operation").

As shown in FIG. 3, when the pressure member 6 is rotated to the maximum in the counterclockwise direction around the rotation shaft 60, when viewed from the right, in response to a lever operation by the user, the other end portion of the pressure member 6 pushes the front end portion of the movement portion 56 up from below. The front end portion of the movement portion 56 pushes the support portion 51 up via the spring 57. As a result, the print head 50 is pressed against the platen roller 4 from below while sandwiching the parallel running portions of the print medium 150 and the ink ribbon 130. In this state, the print medium 150 is fed along the feed path 16 by rotating the platen roller 4. The ink ribbon 130 is heated by the print head 50, and the ink of the ink ribbon 130 is transferred to the print medium 150. The print medium 150 to which the ink has been transferred is then ejected out of the case 2 via the ejection portion 22, whereby printing is complete.

When replacing the medium roll 15 inside the medium holding portion 28, the user performs a lever operation to separate the print head 50 from the platen roller 4. The pressure member 6 rotates in the clockwise direction around the rotation shaft 60, when viewed from the right. Because the other end portion of the pressure member 6 separates from the front end portion of the movement portion 56, the movement portion 56 rotates in the counterclockwise direction around the rotation shaft 5A, when viewed from the right. At this time, the position of the spring 57 moves down, so the support portion 51 rotates in the counterclockwise direction around the rotation shaft 5A, when viewed from the right. The print head 50 moves downward away from the platen roller 4. As a result, the user is able to pull the print medium 150 out from between the platen roller 4 and the print head 50 to the side with the medium holding portion 28.

Figure 5:
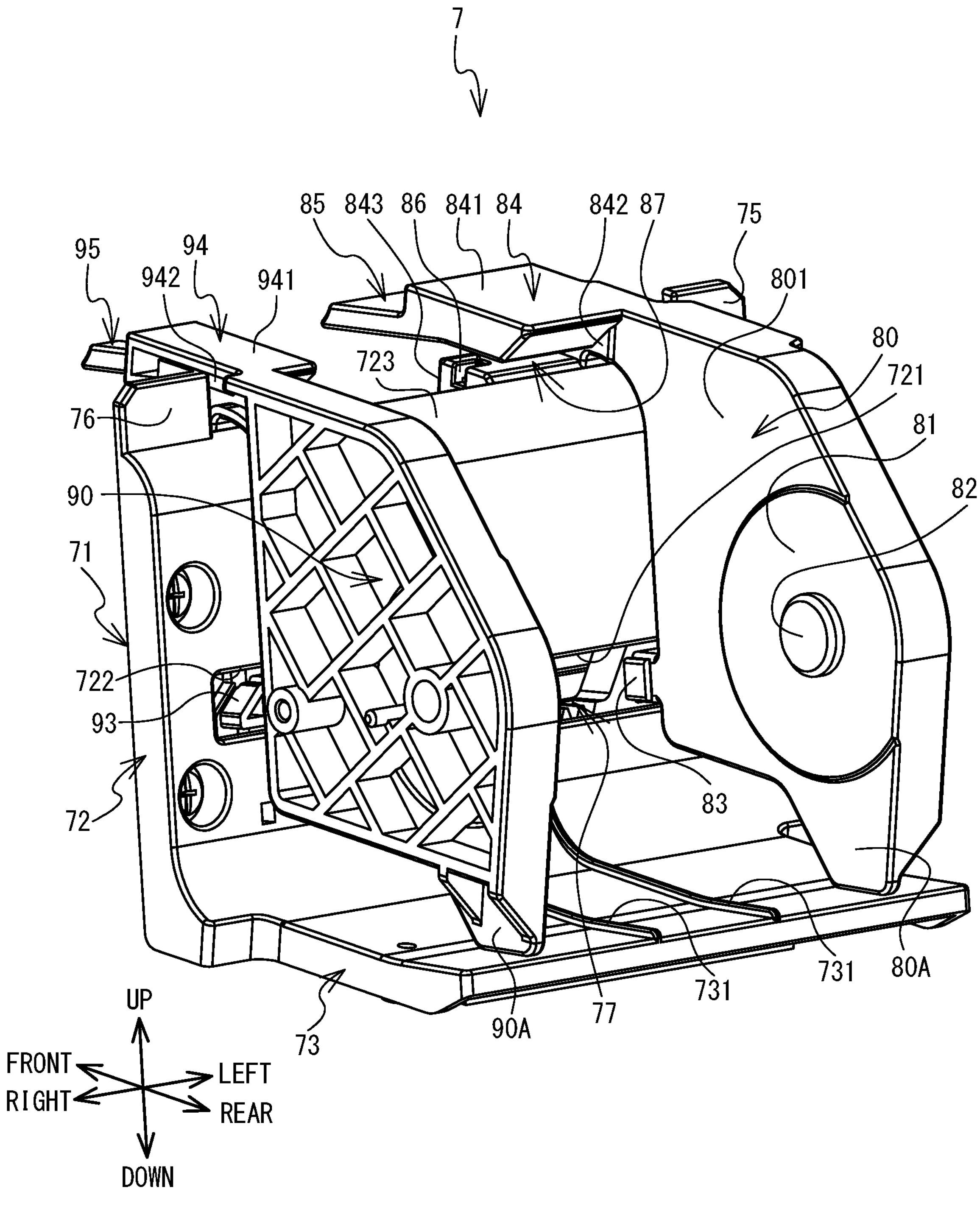
FIG. 5 is a perspective view as viewed from the diagonally rearward right of a guide unit.
Figure 6:
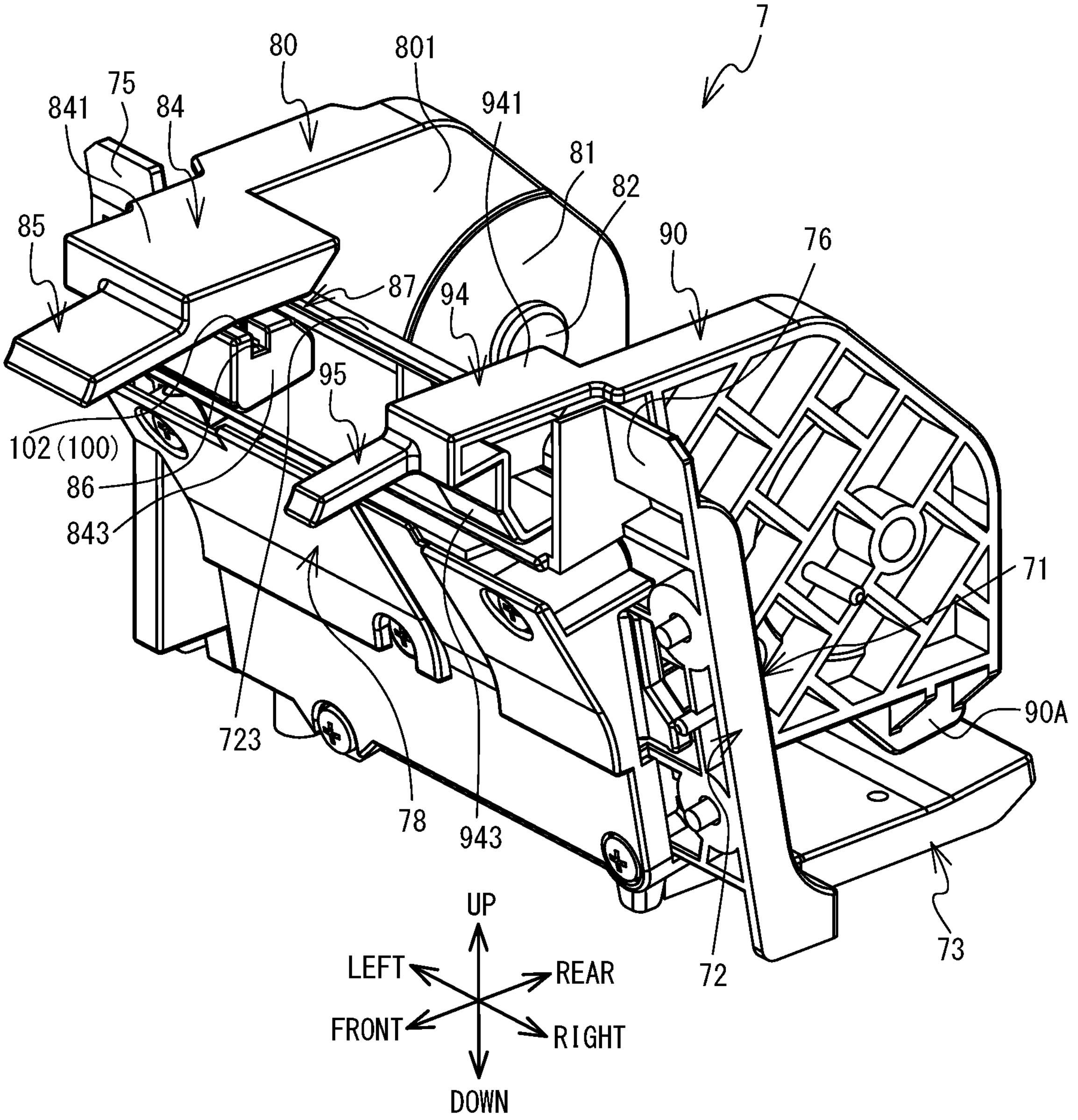
FIG. 6 is a perspective view as viewed from the diagonally forward right of the guide unit.

The structure of the guide unit 7 will now be described with reference to FIG. 5 and FIG. 6. The guide unit 7 is provided with a support base 71, a left guide member 80, a right guide member 90, and a movement mechanism 77, and the like. The support base 71 is formed in a substantially L-shape when viewed from the side, and the medium roll 15 (refer to FIG. 3) is disposed on the upper surface thereof. The support base 71 has a vertical plate portion 72 and a bottom plate portion 73. The vertical plate portion 72 extends in the up-down direction, and is formed in a substantially rectangular shape that is somewhat long in the left-right direction when viewed from the back. The bottom plate portion 73 extends forward from the lower end portion of the vertical plate portion 72, and is formed in a substantially rectangular shape that is long in the left-right direction when viewed from above. The lower end portion of the back surface of the vertical plate portion 72 and the front end portion of the upper surface of the bottom plate portion 73 are connected together in a gentle substantially arc shape when viewed from the side. Two ribs 731 separated from each other in the left-right direction are provided on the upper surface of the bottom plate portion 73. The two ribs 731 extends from the rear end portion of the upper surface of the bottom plate portion 73 to the lower end side of the back surface of the vertical plate portion 72.

The vertical plate portion 72 has a left guide hole 721 and a right guide hole 722. The left guide hole 721 is provided in the lower side of the left side region of the vertical plate portion 72, and passes through the vertical plate portion 72 in the front-rear direction. The left guide hole 721 is formed in a substantially rectangular shape that is long in the left-right direction when viewed from the back. The right guide hole 722 is provided in substantially the center in the up-down direction of the right side region of the vertical plate portion 72, and passes through the vertical plate portion 72 in the front-rear direction. The right guide hole 722 is also formed in a substantially rectangular shape that is long in the left-right direction when viewed from the back, similar to the left guide hole 721. The right guide hole 722 is disposed above the left guide hole 721. An upper end portion 723 of the vertical plate portion 72 is bent toward the front in a substantially arc shape when viewed from the side (refer to FIG. 4 and FIG. 6). An upward protruding piece 75 and an upward protruding piece 76 are provided standing upright on both the left and right sides of the upper end portion 723. The upward protruding piece 75 and the upward protruding piece 76 are formed in a substantially rectangular shape when viewed from the back.

The movement mechanism 77 (refer to FIG. 5) is provided on the front surface side of the vertical plate portion 72. The movement mechanism 77 is connected to connecting arms 83 and 93 of the left guide member 80 and the right guide member 90, described later, via the left guide hole 721 and the right guide hole 722. The movement mechanism 77 operates in conjunction with the movement of one of the left guide member 80 or the right guide member 90 so as to move the left guide member 80 and the right guide member 90 closer to or away from each other based on a midpoint of the support base 71 in the left-right direction. A cover 78 (refer to FIG. 6) is fixed with a screw to the front surface side of the vertical plate portion 72 so as to cover the movement mechanism 77 from the front.

The left guide member 80 is a plate member having a substantially trapezoidal shape when viewed from the side. A circular portion 81 is provided on the rear end side of a right surface 801 of the left guide member 80. The circular portion 81 has a substantially circular shape when viewed from the right side, and bulges out to the right of the right surface 801. The circular portion 81 abuts against the left side surface of the medium roll 15. A shaft support portion 82 is provided in the center portion of the circular portion 81. The shaft support portion 82 has a short axis substantially circular cylindrical shape that protrudes to the right. The shaft support portion 82 is inserted into a hole in a left end portion of a winding tube of the medium roll 15. A leg portion 80A is provided on a rear end side of a lower end portion of the left guide member 80. The leg portion 80A protrudes downward and abuts against the upper surface of the bottom plate portion 73. The connecting arm 83 is provided near a lower portion of the front end portion of the left guide member 80. The connecting arm 83 protrudes forward and is inserted into the left guide hole 721 provided in the vertical plate portion 72 of the support base 71. The connecting arm 83 connects to the movement mechanism 77 provided on the front surface side of the vertical plate portion 72 via the left guide hole 721.

A left side insertion portion 84 is provided protruding forward on an upper portion of the front end portion of the left guide member 80. The left side insertion portion 84 is inserted from the rear into the feed path 16 in the case 2 (refer to FIG. 4). The left side insertion portion 84 is disposed in a position offset to the right from the right surface 801 of the left guide member 80, and is formed in a substantially inverted C-shape when viewed from the back. The inside of the left side insertion portion 84 is a cavity and is open toward the left, and the inside thereof is reinforced with lattice-like ribs. The left side insertion portion 84 has an upper wall portion 841, a side wall portion 842, a lower wall portion 843, a sensor 100, and a forward extension portion 85.

The upper wall portion 841 extends substantially horizontal toward the front and parallel to the upper end portion of the left guide member 80 and is formed in a substantially rectangular shape when viewed from above. The side wall portion 842 protrudes downward from the left side of the lower surface of the upper wall portion 841, and is disposed along the front-rear direction. The lower wall portion 843 protrudes toward the right from the lower end portion of the side wall portion 842 and is formed in a substantially rectangular parallelepiped shape. A back surface of the lower wall portion 843 abuts against the upper end portion 723 of the vertical plate portion 72 from the front. The front end portion of the left guide member 80 abuts against the back surface of the vertical plate portion 72. Therefore, the lower wall portion 843 of the left side insertion portion 84 is locked to the upper end portion 723 of the vertical plate portion 72.

A passage 87 is formed between the lower surface of the upper wall portion 841 and the upper surface of the lower wall portion 843. The passage 87 extends forward. The left end side of a tip end portion of the print medium 150 is inserted from the rear into the passage 87. The left end side of the print medium 150 passes along the passage 87. The lower surface of the upper wall portion 841 and the upper surface of the lower wall portion 843 restrict the position of the left end side of the print medium 150 in the up-down direction.

The sensor 100 is a transmissive optical sensor, and is provided with a light-emitting portion 101 and a light-receiving portion 102. The light-emitting portion 101 is provided on the lower surface of the upper wall portion 841, and emits light downward. The light-receiving portion 102 is provided inside a groove 86 provided on the upper surface of the lower wall portion 843. The groove 86 is provided in the center portion, in the front-rear direction, of an edge line portion where the upper surface and the right surface of the lower wall portion 843 intersect. The groove 86 is formed indented from the right surface toward the left, downward from the upper surface of the lower wall portion 843. The light-receiving portion 102 receives the light emitted downward from the light-emitting portion 101. The sensor 100 detects the presence and position of the print medium 150 in the feed path 16 based on the amount of light received by the light-receiving portion 102. The forward extension portion 85 extends forward from the front surface of the upper wall portion 841 and is formed in a substantially rectangular shape when viewed from above. The forward extension portion 85 extends toward the platen roller 4 provided midway along the feed path 16, and guides the print medium 150 toward the platen roller 4.

The right guide member 90 is substantially symmetrical to the left guide member 80, and is a plate member having a substantially trapezoidal shape when viewed from the side. A shaft support portion and a circular portion, not shown in the drawings, are also provided on the left surface (not shown in the drawings) of the right guide member 90. The circular portion of the right guide member 90 abuts against the right side surface of the medium roll 15. The shaft support portion of the right guide member 90 is inserted into the hole of the right end portion of the winding tube of the medium roll 15. A leg portion 90A is provided on the rear end side of the lower end portion of the right guide member 90. The leg portion 90A protrudes downward and abuts against the upper surface of the bottom plate portion 73. The connecting arm 93 is provided slightly below the midportion, in the up-down direction, of the front end portion of the right guide member 90. The connecting arm 93 protrudes forward and is inserted into the right guide hole 722 provided in the vertical plate portion 72 of the support base 71. The connecting arm 93 connects to the movement mechanism 77 provided on the front surface side of the vertical plate portion 72 via the right guide hole 722.

A right side insertion portion 94 is provided protruding forward on the upper portion of the front end portion of the right guide member 90. The right side insertion portion 94 is also inserted from the rear, together with the left side insertion portion 84, into the feed path 16 in the case 2. The right side insertion portion 94 is disposed in a position offset to the left from the left surface of the right guide member 90, and is formed in a substantially C-shape, when viewed from the back, that is symmetrical to the left side insertion portion 84. The right side insertion portion 94 is narrower in the left-right direction than the left side insertion portion 84 on the left side. The inside of the right side insertion portion 94 is also a cavity and is open toward the right, and the inside thereof is reinforced with lattice-like ribs. The right side insertion portion 94 has an upper wall portion 941, a side wall portion 942 (refer to FIG. 5), a lower wall portion 943, and a forward extension portion 95.

The upper wall portion 941 extends substantially horizontal toward the front and parallel to the upper end portion of the right guide member 90 and is formed in a substantially rectangular shape when viewed from above. The side wall portion 942 protrudes downward from the right side of the lower surface of the upper wall portion 941, and is disposed along the front-rear direction. The lower wall portion 943 protrudes toward the left from the lower end portion of the side wall portion 942 and is formed in a substantially rectangular parallelepiped shape. A back surface of the lower wall portion 943 abuts against the upper end portion 723 of the vertical plate portion 72 from the front. The front end portion of the right guide member 90 abuts against the back surface of the vertical plate portion 72. Therefore, the lower wall portion 943 of the right side insertion portion 94 is locked to the upper end portion 723 of the vertical plate portion 72.

A passage (not shown in the drawings) similar to the passage 87 of the left side insertion portion 84 of the left guide member 80, is also formed between the lower surface of the upper wall portion 941 and the upper surface of the lower wall portion 943. The right end side of the tip end portion of the print medium 150 is inserted from the rear into the passage of the right side insertion portion 94. The right end side of the print medium 150 passes along the passage. The lower surface of the upper wall portion 941 and the upper surface of the lower wall portion 943 restrict the position of the right end side of the print medium 150 in the up-down direction. The forward extension portion 95 is formed in a narrow, long, substantially prismatic column shape extending forward from the front surface of the upper wall portion 941. The forward extension portion 95 extends toward the platen roller 4 provided midway along the feed path 16, and, together with the forward extension portion 85 of the left side insertion portion 84 of the left guide member 80, guides the print medium 150 toward the platen roller 4.

With the upper end portion 723 of the support base 71, the upward protruding piece 75 on the left side is positioned to the left of the left side insertion portion 84 of the left guide member 80. The upward protruding piece 76 on the right side is positioned to the right of the right side insertion portion 94 of the right guide member 90. Therefore, the upward protruding piece 75 and the upward protruding piece 76 restrict the range of movement of the left guide member 80 and the right guide member 90 in the width direction.

The position of the window portion 26 of the case 2 will be described with reference to FIG. 4. When the print device 1 that has been placed on the stand (not shown in the drawings) is viewed from above, the window portion 26 is disposed on the upstream side of the print head 50 and on the downstream side of the sensor 100. More preferably, the window portion 26 is disposed in a position near the side with the print head 50, of the print head 50 and the sensor 100. For example, when the distance between the print head 50 and the window portion 26 in the front-rear direction of the print device 1 is L1 and the distance between the sensor 100 and the window portion 26 in the front-rear direction of the print device 1 is L2, a relationship of L1<L2 is preferable. Note that the distance between the print head 50 and the window portion 26 is the distance from the rear end position (the position on the upstream-most side in the feed direction) of the print head 50 to the position of the center portion of the window portion 26 in the front-rear direction. The distance between the sensor 100 and the window portion 26 is the distance from the position of the center portion of the sensor 100 in the front-rear direction to the position of the center portion of the window portion 26 in the front-rear direction. As a result, the line-of-sight P of the user will easily reach the area near the platen roller 4 and the print head 50 through the window portion 26, so the area near the print head 50 and the platen roller 4 can be visually checked well.

An example of a method to set the print medium 150 in the print device 1 will be described with reference to FIG. 2 to FIG. 4. First, the user separates the print head 50 from the platen roller 4 with a lever operation. Next, the user opens the opening/closing cover 2C of the print device 1 to expose the medium holding portion 28, as shown in FIG. 2. In the guide unit 7, the user pushes the left guide member 80 and the right guide member 90 open in a direction in which they separate from each other, and arranges the medium roll 15 between them. In this state, the user moves the left guide member 80 and the right guide member 90 toward each other such that they sandwich and hold the medium roll 15. At this time, the midportion of the medium roll 15 in the left-right direction is positioned so as to be aligned with the midpoint of the vertical plate portion 72 of the guide unit 7 in the left-right direction.

Next, the user pulls out the print medium 150 from the medium roll 15, and inserts the tip end portion thereof into the passage 87 of the left side insertion portion 84 of the left guide member 80, and a passage (not shown in the drawings) of the right side insertion portion 94 of the right guide member 90, from the rear. By manually feeding the print medium 150 forward as it is, the tip end portion of the print medium 150 moves forward along the feed path 16 inside the case 2, and reaches the area near the platen roller 4. At this time, the user can check the position of the tip end portion of the print medium 150 near the platen roller 4 by looking through the window portion 26 from above. In addition, the user can also check to see whether the tip end portion of the print medium 150 is bent and deformed, or wrinkled or the like. The user can set the tip end portion of the print medium 150 on the print head 50 while checking the position and state of the print medium 150. As a result, the user can prevent any damage such as deformation or wrinkling of the ink ribbon 130 and the print medium 150 due to the print medium 150 being improperly set. After checking the position and state of the print medium 150 through the window portion 26, the user then closes the opening/closing cover 2C and operates the lever to place the print head 50 in contact with the platen roller 4, whereby setting is complete.

As shown in FIG. 4, the sensor 100 is positioned below the eave portion 2A of the case 2. Therefore, even if the case 2 is open, outside light coming in from above the case 2 can be prevented from striking the sensor 100. Therefore, the print device 1 can prevent erroneous detection of the print medium 150 when the print medium 150 is detected by the sensor 100 while the opening/closing cover 2C is open when initially setting the print medium 150. Also, in the present embodiment, by further providing the window portion 26 in the upper wall 2U of the case 2, outside light will enter the case 2 through the window portion 26. Here, at least a portion of the window portion 26, at least a portion of the left side insertion portion 84 (the upper wall portion 841 and the forward extension portion 85) of the left guide member 80, and at least a portion of the light-receiving portion 102 of the sensor 100 are disposed lined up in a virtual straight line Q. Therefore, light that comes in through the window portion 26 toward the light-receiving portion 102 of the sensor 100 will be blocked by the upper wall portion 841 and the forward extension portion 85, so an effect of outside light on the light-receiving portion 102 can be suppressed. Also, the sensor 100 is provided on the left side insertion portion 84 of the left guide member 80, so the print device 1 can block light coming in through the window portion 26 at a position near the sensor 100. As a result, the print device 1 can further suppress outside light from affecting the sensor 100 compared to a configuration in which light coming in through the window portion 26 is blocked at a position far from the sensor 100.

Also, the left guide member 80 and the right guide member 90 are able to move in the width direction of the print medium 150, so the print device 1 can adapt to various widths of the print medium 150. The sensor 100 is provided on the left side insertion portion 84 of the left guide member 80, so the print medium 150 can be detected well even if the positions of the left guide member 80 and the right guide member 90 move according to the width of the print medium 150.

As described above, the print device 1 of the present embodiment is provided with the print head 50, the medium holding portion 28, the opening/closing cover 2C, the feed path 16, the sensor 100, the window portion 26, and the forward extension portion 85. The print head 50 is provided inside the case 2, and performs printing on the print medium 150. The medium holding portion 28 is provided inside the case 2 and holds the print medium 150, and opens to enable the print medium 150 to be taken out and put in. The opening/closing cover 2C opens and closes the opening of the medium holding portion 28. The feed path 16 is provided inside the case 2, and extends from the medium holding portion 28 toward the print head 50, and feeds the print medium 150. The sensor 100 is provided along the feed path 16 and detects the print medium 150. The window portion 26 is provided at a position corresponding to between the sensor 100 and the print head 50, in the upper wall 2U of the case 2. The user can see into the case 2 through the window portion 26. The forward extension portion 85 provided on the left guide member 80 is provided between the sensor 100 and the window portion 26, and blocks light coming in through the window portion 26 toward the sensor 100. Because the print device 1 is provided with the window portion 26, the user can check the position of the tip end of the print medium 150 from outside the case 2 using the window portion 26. Light that comes in through the window portion 26 toward the sensor 100 is blocked by the forward extension portion 85. Therefore, the print device 1 can inhibit the sensor 100 from being affected by light that enters through the window portion 26. The sensor 100 is provided in the feed path 16 inside the case 2, and is thus not easily affected by outside light.

The present disclosure is not limited to the embodiment described above; various modifications are also possible. The print device 1 is a thermal-transfer print device that uses the ink ribbon 130, but the print device 1 may also be a print device that does not use the ink ribbon 130. The print device 1 may alternatively be a print device that uses a color print medium in which a plurality of color layers of different colors created by thermal temperature are layered, for example.

The sensor 100 is a transmissive optical sensor, but the detection principle of the sensor is not limited as long as the sensor is able to detect the print medium 150. The sensor 100 may be a reflective optical sensor or a sensor having a physical switch, for example. On the left side insertion portion 84 of the left guide member 80, the light-emitting portion 101 of the sensor 100 is arranged on the lower surface of the upper wall portion 841, and the light-receiving portion 102 of the sensor 100 is arranged on the upper surface of the lower wall portion 843, but this arrangement may be reversed. More specifically, the light-emitting portion 101 may be arranged on the upper surface of the lower wall portion 843, and the light-receiving portion 102 may be arranged on the lower surface of the upper wall portion 841. For example, with a reflective sensor in which the light-emitting portion and the light-receiving portion are integrated, the light-emitting portion and the light-receiving portion may be arranged on the upper surface of the lower wall portion 843 of the left side insertion portion 84, or on the lower surface of the upper wall portion 841 of the left side insertion portion 84. The sensor 100 is provided on the left side insertion portion 84 of the left guide member 80, but may alternatively be provided on the right side insertion portion 94 of the right guide member 90.

The guide unit 7 is such that the left guide member 80 and the right guide member 90 move in conjunction in the width direction, but they may also move independently of each other. Also, one of the left guide member 80 or the right guide member 90 may be fixed and only the other may move in the width direction. The print device 1 has the guide unit 7 disposed on the medium holding portion 28, but the guide unit 7 may alternatively be omitted.

In the print device 1, the window portion 26 is formed by fitting transparent resin into the opening 25 provided in the upper wall 2U of the case 2, but the opening 25 may alternatively be the window portion. The shape of the window portion 26 may be a shape other than rectangular, but is preferably long in the width direction of the print medium 150. The window portion 26 is provided in the upper wall 2U of the case 2, but may be provided somewhere other than the upper wall 2U as long as it is in a position that enables the print head 50 to be seen from outside the case 2.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A print device comprising:

a head provided in a case, the head performing printing on a medium;

a medium holding portion provided in the case, the medium holding portion holding the medium and opening to allow the medium to be taken out and put in;

an opening/closing cover opening and closing an opening in the medium holding portion;

a feed path provided in the case, the feed path extending from the medium holding portion toward the head and feeding the medium;

a sensor provided in the feed path, the sensor detecting the medium;

a window portion provided in a position corresponding to between the sensor and the head, in a wall portion of the case, the window portion allowing a inside of the case to be seen from outside; and a blocking wall provided between the sensor and the window portion, the blocking wall blocking a light coming in through the window portion toward the sensor.

2. The print device according to claim 1, wherein a distance between the window portion and the head is shorter than a distance between the window portion and the sensor when viewed from the wall portion side.

3. The print device according to claim 1, further comprising:

a guide member provided in the medium holding portion, the guide member restricting the position of the medium in a width direction orthogonal to a feed direction of the feed path, wherein the guide member includes an insertion portion disposed inserted into the feed path, and the sensor is provided on the insertion portion.

4. The print device according to claim 3, wherein the blocking wall is provided on the insertion portion.

5. The print device according to claim 3, wherein the guide member is provided so as to be able to move in the width direction inside the medium holding portion.

6. The print device according to claim 1, wherein the sensor includes a light-emitting portion emitting a light toward the feed path, and a light-receiving portion receiving the light emitted from the light-emitting portion, and at least a portion of the window portion, at least a portion of the blocking wall, and at least a portion of the light-receiving portion of the sensor are disposed lined up in a straight line.

* * * * *